(12) United States Patent  
Gold et al.

(10) Patent No.: US 8,629,678 B2
(45) Date of Patent: Jan. 14, 2014

(54) FORMATION RESISTIVITY IMAGING IN CONDUCTIVE BOREHOLES

(75) Inventors: Randy Gold, Houston, TX (US); Stanislav W. Forgang, Houston, TX (US); Dinesh P. Shah, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 629 days.

(21) Appl. No.: 12/203,483

(22) Filed: Sep. 3, 2008

(65) Prior Publication Data

US 2010/0052690 A1 Mar. 4, 2010

(51) Int. Cl.
*G01V 3/00* (2006.01)

(52) U.S. Cl.
USPC .......................................... 324/374; 324/367

(58) Field of Classification Search
USPC ......... 324/347, 348, 354, 355, 356, 357, 358, 324/360, 366, 367, 368, 369, 371, 373, 374, 324/375

See application file for complete search history.

(56) References Cited

U.S. PATENT DOCUMENTS

| 3,136,942 | A | * | 6/1964 | Schuster | 324/374 |
| 6,600,321 | B2 | * | 7/2003 | Evans | 324/369 |
| 6,691,805 | B2 | | 2/2004 | Thaemlitz | |
| 6,714,014 | B2 | | 3/2004 | Evans et al. | |
| 7,112,557 | B2 | | 9/2006 | Thaemlitz | |
| 7,382,136 | B2 | * | 6/2008 | Hayman | 324/367 |
| 2007/0257678 | A1 | * | 11/2007 | Wang | 324/366 |

* cited by examiner

*Primary Examiner* — Jermele M Hollington
*Assistant Examiner* — David M. Schindler
(74) *Attorney, Agent, or Firm* — Mossman Kumar & Tyler PC

(57) ABSTRACT

An apparatus for providing an image of a resistivity property of an earth formation surrounding a borehole is provided. The apparatus, in one aspect, may include a plurality of measure electrodes that are configured to convey an electrical current into the earth formation. In one aspect, each measure electrode may be substantially surrounded by an associated insulator that extends away from a tool body in a manner that blocks at least a portion of a vertical current flowing in a conductive fluid when the tool is operated to log the borehole. A processor provides an image of the resistivity property of the earth formation using the current in plurality of measure electrodes.

10 Claims, 5 Drawing Sheets

FORMATION RESISTIVITY IMAGING IN CONDUCTIVE BOREHOLES

BACKGROUND OF THE DISCLOSURE

1. Field of the Disclosure

This disclosure generally relates to a method and apparatus for imaging of earth formations using resistivity measurements in a borehole that has a conducting fluid.

2. Background of the Art

Electrical logging devices are often used for imaging boreholes. There are two categories of electrical logging devices that are typically used for logging wellbores for providing borehole images. The first category relates to galvanic devices, wherein a measure electrode (current source or sink) is used in conjunction with a return electrode. In one such device, current flows from a current source to the measure electrode, which current is induced into the formation surrounding the borehole. The current from the formation returns back to the current source via the return electrode. The second category relates to inductive measuring tools in which an antenna within the tool induces a current flow within the earth formation. The magnitude and/or phase of the induced current is detected using either the same antenna or a separate receiver antenna.

There are several modes of operation of a galvanic device. In one mode, the current at a current electrode is maintained constant and a voltage is measured between a pair of monitor electrodes. In another mode the voltage of the measure electrode is maintained constant and the current flowing from the measure electrode is measured.

When measurements are made using resistivity tools in a borehole that has a conductive fluid, undesired current flowing axially along the borehole fluid shunts the desired current path through the formation. To mitigate this effect, a common practice is to attempt to maintain the borehole fluid at the same potential as the measure electrode. The present disclosure provides an improved resistivity tool and method for borehole imaging.

SUMMARY OF THE DISCLOSURE

One embodiment of the disclosure is an apparatus for providing an image of a resistivity property of an earth formation. In one aspect, the apparatus may include a logging tool configured to be conveyed in a borehole having a conductive fluid therein; a plurality of measure electrodes on the logging tool configured to induce an electrical current into the earth formation, each of the plurality of measure electrodes being surrounded by an associated insulator that extends away from a body of the logging tool; and at least one processor configured to provide an image of the resistivity property of the earth formation using the current in each of the plurality of measure electrodes.

Another embodiment of the disclosure is a method of imaging a resistivity property of an earth formation. The method may include conveying a logging tool into a borehole having a conductive fluid therein, using a plurality of measure electrodes on the logging tool to convey an electrical current into the earth formation, reducing an axial flow of current in the fluid in the borehole by surrounding each of the plurality of measure electrodes by an associated insulator that extends away from a body of the logging tool, and providing an image of the resistivity property using the current in each of the plurality of measure electrodes.

Another embodiment of the disclosure is a computer-readable medium accessible to a processor. The computer-readable medium includes instructions which enable the processor to provide an image of a resistivity property of an earth formation using measurements made in a borehole by a logging tool having a plurality of measure electrodes, wherein each of the plurality of measure electrodes is surrounded by an associated insulator that extends away from a body of the logging tool,

BRIEF DESCRIPTION OF THE FIGURES

The present disclosure is best understood with reference to the accompanying figures in which like numerals generally refer to like elements and in which.

DETAILED DESCRIPTION OF THE DISCLOSURE

Figure 1:
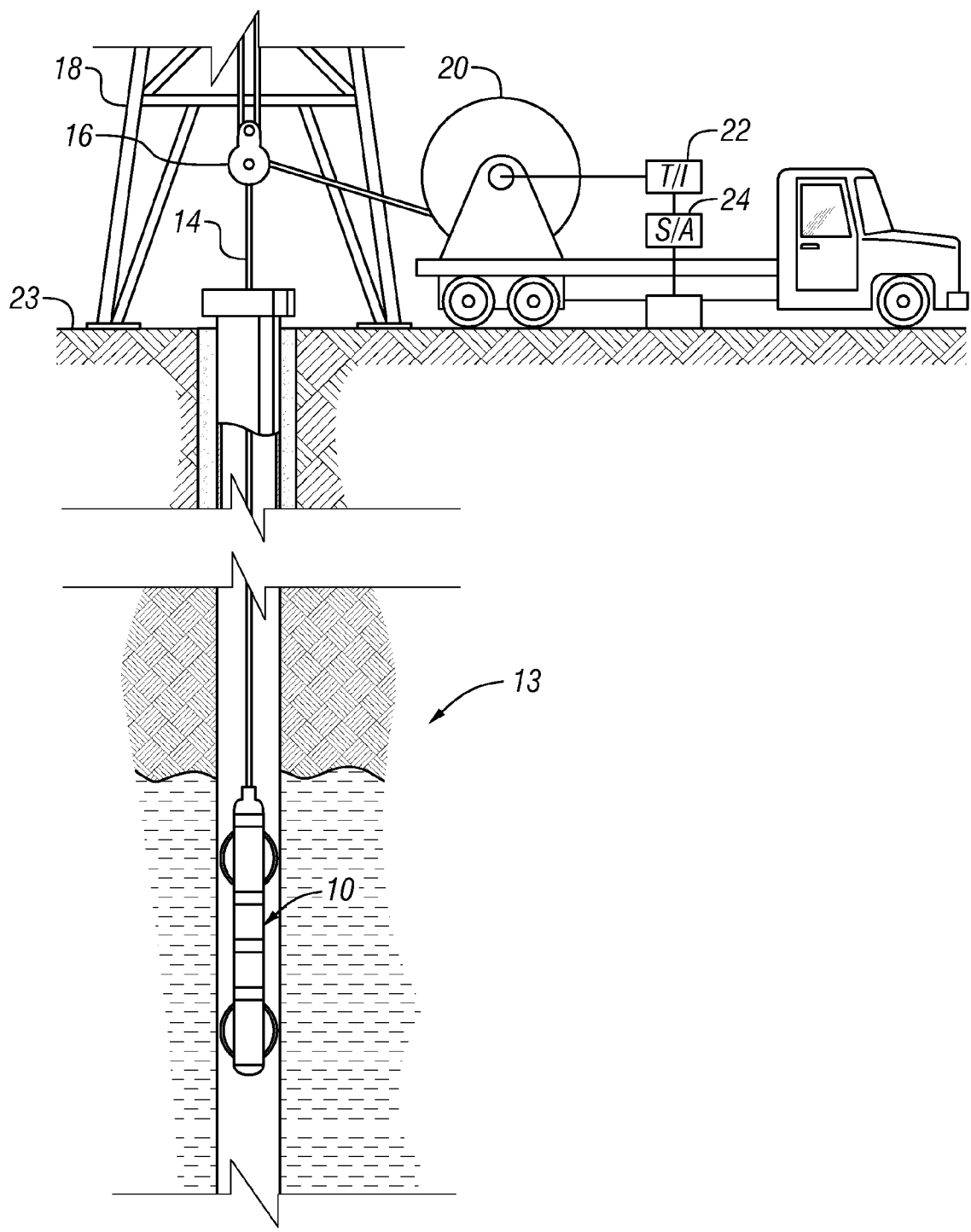
FIG. 1 shows an exemplary logging tool suspended in a borehole.

FIG. 1 shows an exemplary imaging tool 10 suspended in a borehole 12 penetrating an earth formations 13 from a suitable cable 14 that passes over a sheave 16 mounted on a drilling rig 18. The cable 14 typically may include a stress member and a number of conductors (typically seven) for transmitting commands to the tool 10, receiving data from the tool, and supplying power to the tool 10. The tool 10 is raised and lowered by a draw works 20. An electronic module 22 on the surface 23 transmits operating commands downhole and, in return, receives data from the tool 10, which may be recorded on a suitable data storage medium for concurrent or later data processing. The data may be transmitted in an analog form or a digital form. A processor, such as a suitable computer 24, may be provided for performing data analysis in the field or in real time. Alternatively, the recorded data may be sent to a remote processing center for post processing of the data. Also, the data may be partially processed in real time and partially at a processing center. The tool 10 includes at least one pad 26, which is discussed below in reference to FIGS. 2-4.

Figure 2:
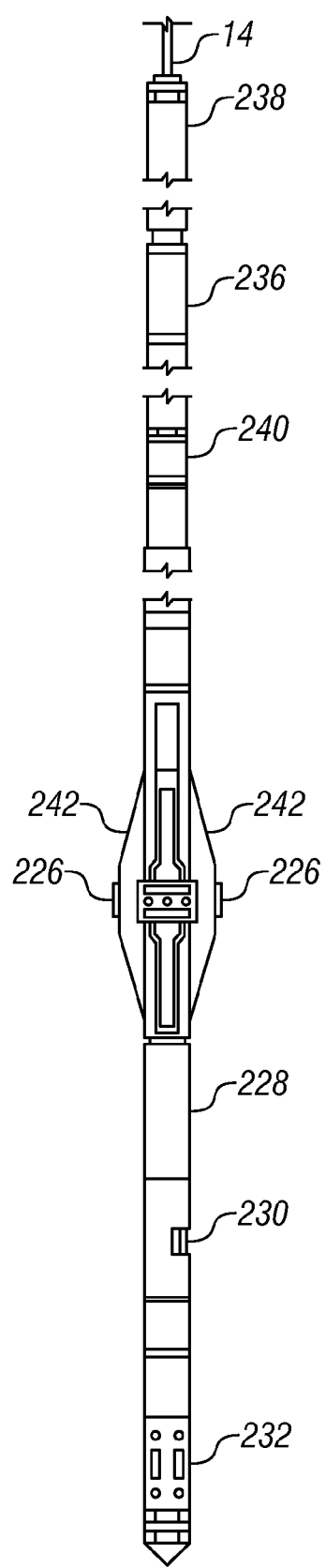
FIG. 2 is a mechanical schematic view of an exemplary imaging tool.

Referring now to FIG. 2, the tool 10 comprises an imager system that may include resistivity arrays 226 and, optionally, a mud cell 230 and may further include a circumferential acoustic televiewer 232. The resistivity arrays 226 may be supported by bowsprings 242 to maintain contact with the borehole wall 28 (See FIG. 1). An electronics module 228 may be located at any one or more suitable locations and not necessarily in the locations indicated. An orientation module 236, including at least one of a magnetometer, an accelerometer and an inertial guidance system may be mounted above (uphole) the resistivity arrays 226 and the acoustic televiewer 232. The upper portion of the tool 10 is shown to contain a telemetry module 238 for sampling, digitizing and transmission of the data samples from the various components of the tool 10 to the electronic module 22 at the surface. In one aspect, the data may be digitized by the tool 10 before transmitting such data to the surface. In an alternative arrangement, the data may be transmitted in analog form to the surface and digitized by surface the electronic module 22. In the exemplary tool 10, resistivity arrays 226 are shown. Any suitable number of resistivity arrays, however, may be utilized.

Figure 3A:
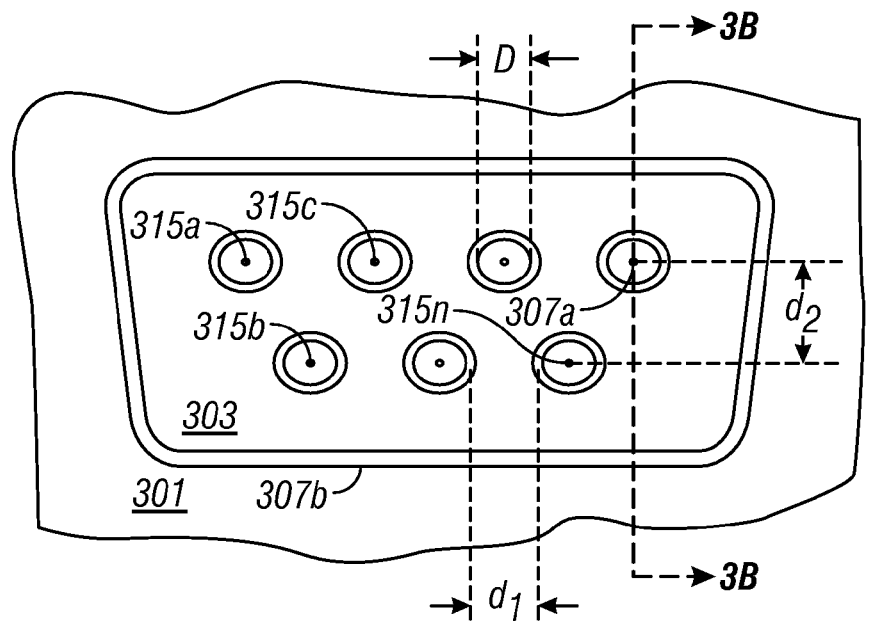
FIG. 3A is a detail view of an electrode pad of an exemplary imaging tool.

FIG. 3A illustrates an exemplary front view of a pad 301 that includes one resistivity array 226. The resistivity arrays 226 includes a number of measure electrodes 315a, 315b, 315c . . . and 315n set within a guard electrode 303. The measure electrodes are shown arranged in two spaced-apart rows. The measure electrodes also may be arranged in a single row or in more than two rows. The distance between the adjacent rows is shown to be $d_2$. Each electrode is shown to have a dimension D along the horizontal direction. In one aspect, the guard electrode 303 may be substantially rectangular. In one aspect, the guard electrode 303 may be separated from the pad body 301 by an insulator 307b. In one embodiment of the disclosure, the spacing between the measure electrodes 315a, 315b, 315c . . . and 315n may be selected to provide an overlap in azimuth, i.e., the dimension "D" of the measure electrode, such as electrode 315e, is greater than the horizontal spacing $d_1$ between the edges of electrodes 315n–1 and 315n in the adjacent row. For the purpose of this disclosure, the measure electrodes may not include an azimuthal overlap, such as shown in FIG. 2. In operation, the guard electrode 303 is maintained at a potential substantially equal to that of the measure electrodes 315a, 315b, 315c . . . and 315n to reduce the vertical flow of the current in the borehole fluid.

The return electrode 240 (FIG. 2) is typically placed at a remote location, such as a location uphole of the measure electrodes 315a, 315b, 315c . . . 315n. For such a positioning of the return electrode, the currents in the individual measure electrodes 315a, 315b, 315c . . . 315n are indicative of the formation conductivity when the borehole is filled with a non-conducting fluid. The current flow is substantially radial towards the borehole wall 28 (FIG. 1) when the borehole fluid is non-conducting or has a conductivity less than that of the formation.

When the borehole is filled with a fluid having significant electrical conductivity, the fluid path shunts the current path through the formation, which can provide erroneous estimates of the formation conductivity. The guard electrode 303, when maintained at a potential close to that of the measure electrodes 315a, 315b, 315c . . . 315n, serves to focus the current from the measure electrodes in a radial path into the formation, which provides some correction for the fluid path shunt. However, such a correction for the fluid path shunt is typically not sufficient.

Figure 3B:
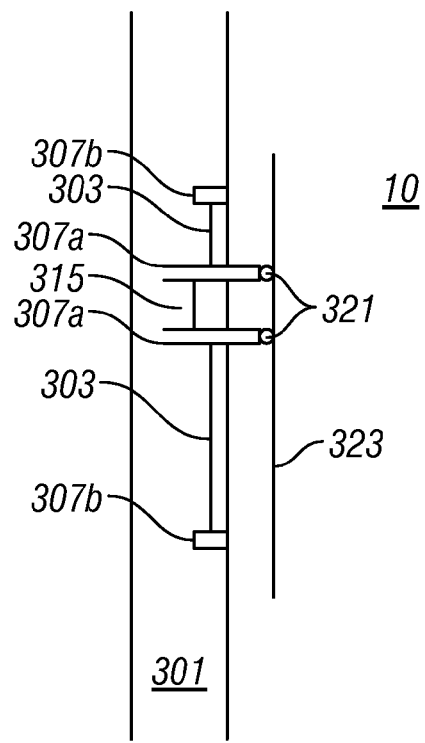
FIG. 3B illustrate a pad in which the measure electrodes are surrounded by insulators.

FIG. 3B shows a cross-section of the pad 301 made according to one embodiment of the disclosure. An exemplary electrode 315 is shown separated from the guard electrode 303 by an insulator 307a. The insulator 307a extends away from the pad 301 towards a wall 323 of the borehole. Spacers 321 may be provided on the insulators 307a, so that when the spacers are in contact with the borehole wall 323, a predefined small gap between the measure electrode 315 and the borehole wall remains. Such an insulator with a spacer blocks at least a portion of the vertical current in the conductive fluid between the insulator and the borehole wall. The spacers 321 allow the tool to move substantially freely in the borehole 12.

Figure 4:
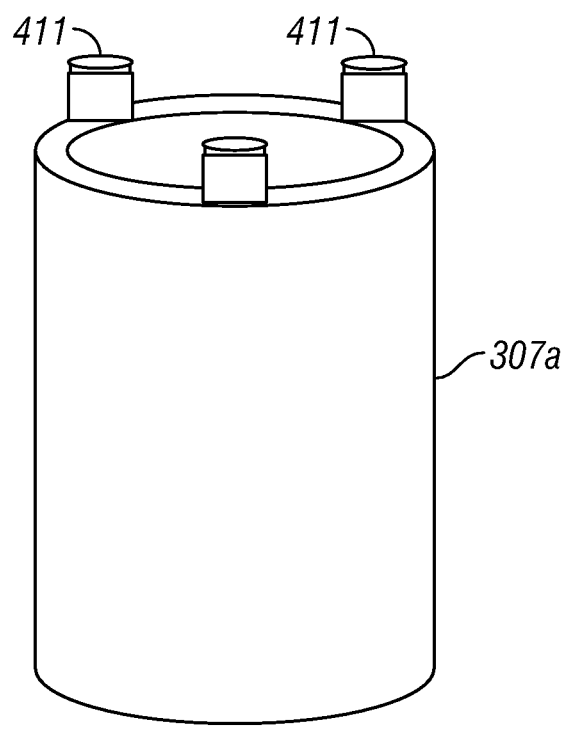
FIG. 4 shows an insulator with spacers.

Certain features of the insulator 307a made according to one embodiment of the disclosure are shown in more detail in FIG. 4. Three spacers 411 are shown attached to the insulator 307 to maintain the insulator 307a in a spaced-apart position from the borehole wall. During logging of the borehole, fluid communication between the measure electrodes 315a, 315b, 315c . . . 315n and the outside of the insulators 307a occur in the space between the spacers 411. In one embodiment, an insulator may be provided for each measure electrode, as described above.

In another aspect, an insulator with spacers may also be used with respect to the return electrode 240. In general, however, the benefit of using an insulator with the return electrode is less than using the insulators with the measure electrodes. Such benefit tends to decrease as the distance between the return electrode and the measure electrodes increases. FIGS. 2B, 3A and 3B merely show an exemplary embodiment of a resistivity array and therefore such a configuration should not be construed as a limitation.

At any depth position of the tool 10 in the borehole 12, each of the measure electrodes 315a, 315b, 315c . . . 315n produces a signal indicative of the conductivity of the earth formation that lies directly in front of such electrode. The processor, in one aspect, may associate with the measurement of each measure electrode (i) an azimuth of the logging tool 10 obtained from the orientation module 236, (ii) a depth measurement of the electrode, and (iii) process the current measurement from each measure electrode to provide a resistivity image of the borehole wall 28.

Figure 5:
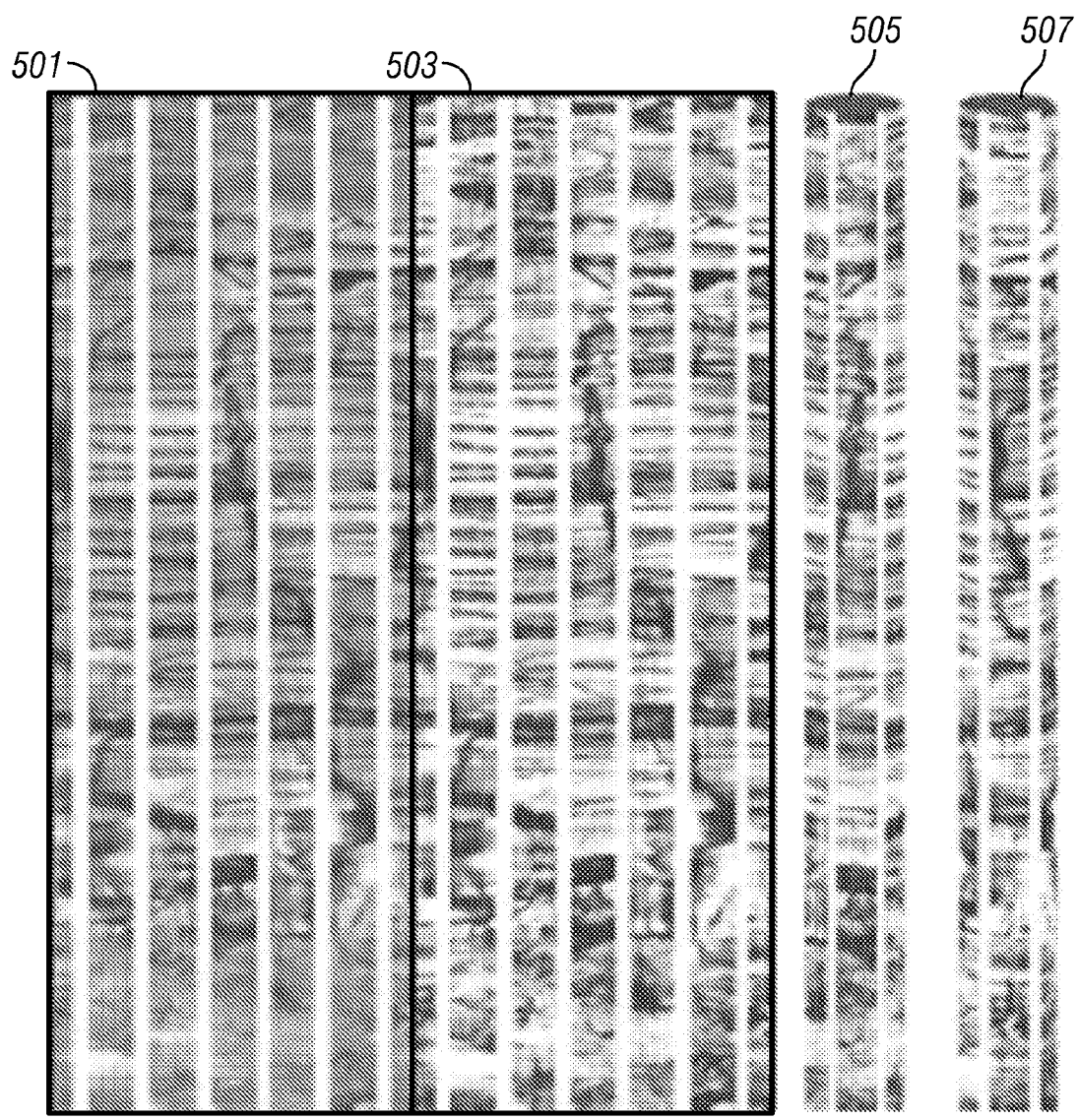
FIG. 5 shows an exemplary image obtained with a resistivity imaging tool.

FIG. 5 shows an exemplary image of a borehole wall using the apparatus described herein above. The first track 501 shows a two-dimensional (2-D) image of the borehole wall with a fixed gain display. The second track 503 shows the 2-D image of the borehole wall with a dynamic gain applied to the display. The third track 505 and the fourth track 507 show two isometric views of the borehole wall in cylindrical geometry. The image generated may then be recorded on a suitable medium such as a memory device.

In the present disclosure the data may processed by utilizing a computer program implemented on a suitable machine-readable medium that enables one or more processors to perform the acquisition and processing of the data. The term processor as used in this disclosure is intended to include any suitable processor, including, but not limited to, microprocessors and field programmable gate arrays (FPGAs). The machine-readable medium may include any data storage device, including, but not limited to, ROMs, EPROMs, EAROMs, Flash Memories, hard disks and Optical disks. As noted above, the processing may be performed downhole or at the surface or partially downhole and partially at the surface.

While the foregoing disclosure is directed to certain embodiments of the apparatus and method for imaging boreholes, various modifications will be apparent to those skilled in the art. It is intended that all such modifications within the scope and spirit of the appended claims be embraced by the foregoing disclosure.

What is claimed is:

1. An apparatus configured to provide an image of a resistivity property of an earth formation, the apparatus comprising:
    a logging tool configured to be conveyed in a borehole having a conductive fluid therein;
    a plurality of measure electrodes on a pad of the logging tool configured to sense an electrical current in the earth formation, each of the plurality of measure electrodes being surrounded by an associated insulator that extends away from the pad of the logging tool limiting a vertical current path in the conductive fluid along the borehole between each of the electrodes and the earth formation, such that a gap exists between an outer face of the pad and a wall of the borehole, the gap extending vertically along the borehole to axial ends of the pad;
    at least one guard electrode encircling the plurality of measure electrodes; and at least one processor configured to provide an image of the resistivity property using the current sensed by at least one of the plurality of measure electrodes, wherein each associated insulator further comprises a spacer that maintains a separation between a body of the corresponding associated insulator and the wall of the borehole, such that the plurality of measure electrodes is in direct contact with a continuous body of the conductive fluid in direct contact with the guard electrode where and when the pad is urged against the wall of the borehole.

2. The apparatus of claim 1 wherein:

the at least one guard electrode is at a potential substantially equal to a potential of each measure electrode of the plurality of measure electrodes.

3. The apparatus of claim 1 further comprising a return electrode at a location that is selected from: (i) on the logging tool, and (ii) at a remote location.

4. The apparatus of claim 1 wherein the logging tool is part of a string of logging instruments, the apparatus further comprising a wireline configured to convey the logging string into the borehole.

5. A method of imaging a resistivity property of an earth formation, the method comprising:

conveying a logging tool into a borehole having a conductive fluid therein;

using a plurality of measure electrodes on a pad of the logging tool to sense an electrical current in the earth formation;

reducing an axial flow of current in the fluid in the borehole by surrounding each of the plurality of measure electrodes with an an associated insulator that extends away from the pad of the logging tool limiting a vertical current path in the conductive fluid along the borehole between each of the electrodes and the earth formation, such that a gap exists between an outer face of the pad and a wall of the borehole, the gap extending vertically along the borehole to axial ends of the pad;

encircling the plurality of measure electrodes with at least one guard electrode; and using, for each associated insulator, an insulator that has a spacer that maintains a separation between a body of the corresponding associated insulator and the wall of the borehole, such that the plurality of measure electrodes is in direct contact with a continuous body of the conductive fluid in direct contact with the guard electrode where and when the pad is urged against the wall of the borehole; and providing an image of the resistivity property using the current sensed by one of the plurality of measure electrodes.

6. The method of claim 5 further comprising:

further reducing the axial flow of current in the borehole by maintaining the at least one guard electrode at a potential substantially equal to a potential of each measure electrode of the plurality of measure electrodes.

7. The method of claim 5 further comprising providing a return electrode at a location that is selected from: (i) on the logging tool, and (ii) at a remote location.

8. The method of claim 5 further comprising:

positioning the logging tool as part of a string of logging instruments; and using a wireline configured to convey the logging string into the borehole.

9. A non-transitory computer-readable medium product having stored thereon instructions that when read by at least one processor cause the at least one processor to perform a method, the method comprising:

providing an image of a resistivity property of an earth formation using a current sensed by a plurality of measure electrodes on a logging tool conveyed in a borehole with a conductive fluid therein, each measure electrode of the plurality of measure electrodes being surrounded by an associated insulator that extends away from a pad of the logging tool limiting a vertical current path in the conductive fluid along the borehole between each of the electrodes and the earth formation, such that a gap exists between an outer face of the pad and a wall of the borehole, the gap extending vertically along the borehole to axial ends of the pad, wherein each associated insulator further comprises a spacer that maintains a separation between a body of the corresponding associated insulator and the wall of the borehole, such that the plurality of measure electrodes is in direct contact with a continuous body of the conductive fluid in direct contact with a guard electrode encircling the plurality of measure electrodes where and when the pad is urged against the wall of the borehole.

10. The non-transitory computer-readable medium product of claim 9 further comprising at least one of: (i) a ROM, (ii) an EPROM, (iii) an EAROM, (iv) a flash memory, and (v) an optical disk.

* * * * *